United States Patent [19]

Orloff et al.

[11] 3,860,342

[45] Jan. 14, 1975

[54] DUAL-WAVELENGTH SCANNING DOPPLER VELOCIMETER

[75] Inventors: Kenneth L. Orloff, Mountain View; George R. Grant, Sunnyvale; William D. Gunter, Jr., San Jose, all of Calif.

[73] Assignee: The United States of America as represented by the Administrator of the National Aeronautics and Space Administration, Washington, D.C.

[22] Filed: Apr. 18, 1973

[21] Appl. No.: 352,383

[52] U.S. Cl. ................................................ 356/28
[51] Int. Cl. ........................................... G01p 3/36
[58] Field of Search ...................... 356/28; 250/226

[56] References Cited
UNITED STATES PATENTS
3,723,004    3/1973    Brayton ............................. 356/28
3,730,625    5/1973    Brayton ............................. 356/28

Primary Examiner—Maynard R. Wilbur
Assistant Examiner—S. C. Buczinski
Attorney, Agent, or Firm—Darrell G. Brekke; Armand G. Morin, Sr.; John R. Manning

[57] ABSTRACT

A laser Doppler velocimeter for simultaneously measuring localized orthogonal velocity components in a fluid stream without perturbation of the flowfield wherein a first pair of beams of a first common wavelength and a second pair of beams of a second common wavelength are derived from a single laser source, directed along a single optical axis such that the respective beams of each pair of beams are disposed parallel to the axis, symmetrically about the axis, and are positioned orthogonally about the axis relative to each other. The four beams are then focused upon a selected test volume within the flowfield and light scattered at that point is collected by an appropriate optical system and focused onto photodetectors which develop electrical output signals commensurate with the orthogonal velocity components at the test point.

10 Claims, 6 Drawing Figures

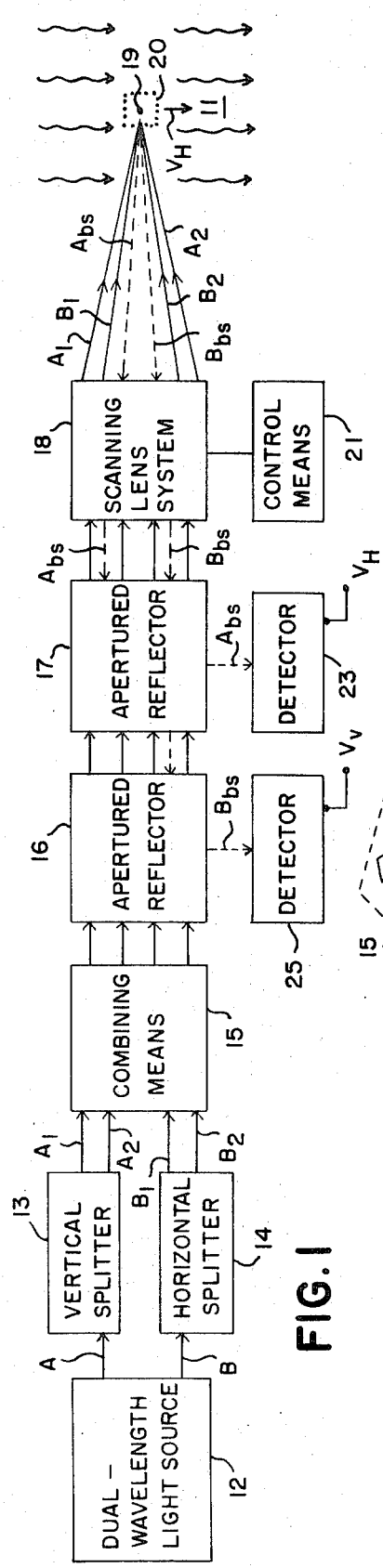
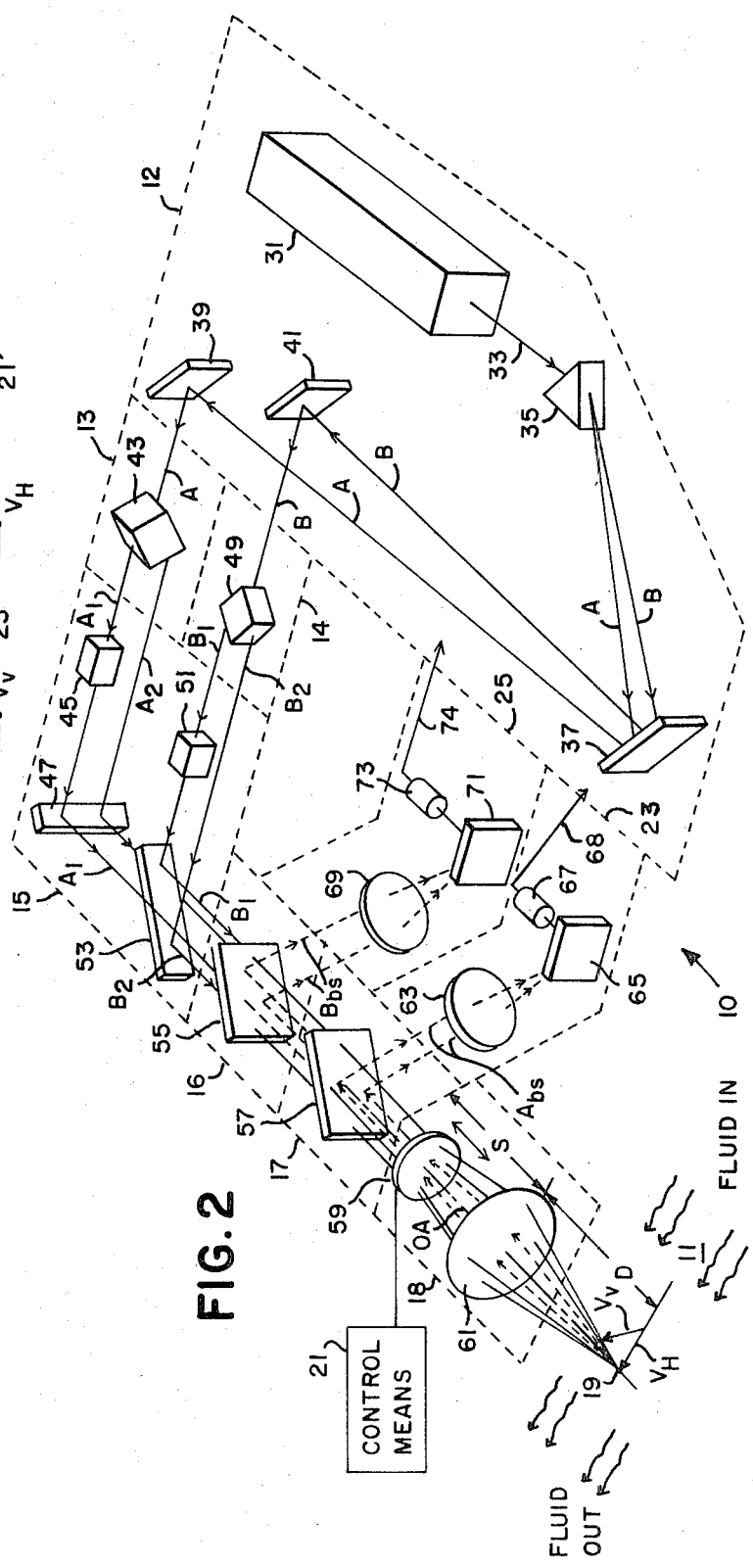

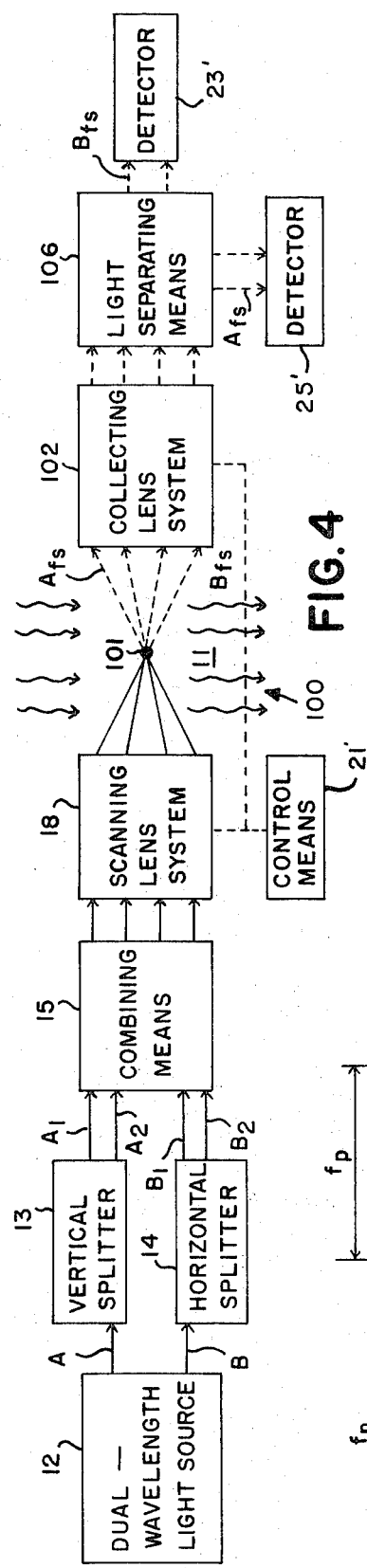
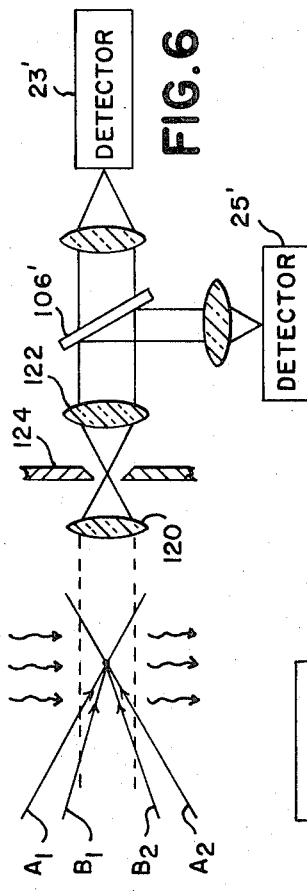
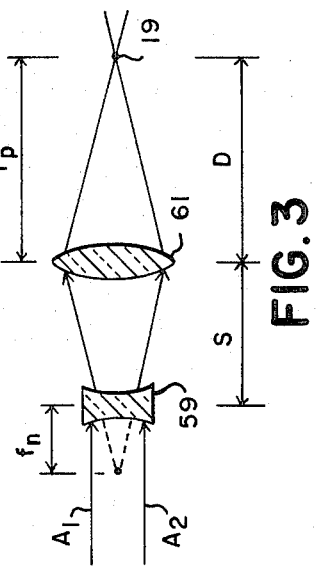

DUAL-WAVELENGTH SCANNING DOPPLER VELOCIMETER

The invention described herein was made by employees of the United States Government and may be manufactured and used by or for the government for governmental purposes without the payment of any royalties thereon or therefor.

BACKGROUND OF THE INVENTION

1. Field of the Invention

The present invention relates generally to velocity measuring devices for monitoring the velocity characteristics of fluids within a moving stream and more particularly to a velocimeter device for simultaneously measuring localized orthogonal fluid velocity components without perturbation of the flowfield.

2. Description of the Prior Art

Laser Doppler velocimeters are used for the measurement of localized fluid velocities without perturbation of the flowfield. The basic principle of operation is that coherent laser light scattered from particulate matter in a fluid moving with a particular velocity will be Doppler-shifted by an amount determined by the laser wavelength and the index of refraction of the scattering medium. Early instruments recombined the scattered and incident (unshifted) waves at the photocathode of a photo-multiplier tube to produce a beat signal at a frequency which is linearly related to the average velocity of the fluid within a small scattering volume.

Modern laser velocity instruments employ a cross-beam system wherein parallel incident beams are focused in the flow stream through a single lens. Light collected from the intersection volume at any angle then contains a Doppler frequency which results from the heterodyning of the scattered light from the two incident beams (or equivalently scattered light from particles passing through an interference fringe pattern at the beam intersection). However, this type of velocimeter is only sensitive to the single component of velocity which is perpendicular to the bisector of the angle between the two beams, and signal processing must be used to obtain the desired fluid velocity information.

It is often desirable to measure orthogonal velocity components simultaneously in order to evaluate turbulent shear stresses and to, in general, give a more complete description of the fluid flowfield being studied. Laser velocimeters operating in the differential-Doppler configuration have conventionally obtained the two orthogonal velocity components by masking the receiving optics, or by using polarization isolation or acousto-optic isolation of the two dimensions. These types of systems, however, suffer from several drawbacks. Notably among such drawbacks is that all of these techniques divide the available laser power over the two orthogonal channels of the system, and risk the possibility of incomplete separation of the Doppler signals at the detector(s).

Furthermore, systems which mask the receiving optics suffer from an additional drawback in that they restrict the light which is collected. Whereas small collection solid angles are acceptable in the forward scatter mode, movement of the test volume requires either a rigid common structure surrounding the flow system or a complicated traversing system on each side of the flow stream which moves in such a way that the system remains focused. In the back scatter mode the problem of spatial movement of the interrogation volume is alleviated but the small solid angles of light collection seriously restrict the scanning range. Moreover, advantage is not taken of the crossed-beam system wherein signal broadening is not affected by collection solid angle. That is, the velocity ambiguity increases with the solid angle of collection when the Doppler-difference is determined by the receiving objects. In the cross-beam system the ambiguity is set by the input optics allowing for large collection angles.

In many instances it is necessary to spatially traverse the flowfield in some fashion in order to obtain transverse velocity profiles. Heretofore, scanning of the flowfield has been accomplished by either keeping the velocimeter system fixed and translating the flow apparatus, by translating the entire laser system about the flow field, or by using reflective optics.

All contemporary systems which remain focused and use transmitting optics have previously been limited to slot scanning of the flowfield. However, for flow streams which are unsteady it is necessary that one traverse the flowfield rapidly, obtaining at least the mean velocity information in a time short compared with the characteristic movement time of the flow stream.

Although all-reflecting (cassegrain) systems have been built, such systems are not well adapted to scanning applications. In order to hold forces and acceleration down, a moving mirror or lens must be moved a relatively short distance. At the same time the interrogated region or test volume must scan over a much larger distance than the moving element providing the scan. Designs to accomplish this suffer from requirements for non-spherical mirrors and high structural rigidity as compared to lens systems.

Examples of systems related to the above mentioned prior art are disclosed in the U.S. Pat. Nos. to Seaton, 3,446,558; Blau, et al., 3,489,495; Gemerdsfelder et al., 3,525,569; Paine, 3,532,427; Shigemoto, 3,547,540; and Kolb, Jr., 3,644,042.

SUMMARY OF THE PRESENT INVENTION

It is therefore a principal object of the present invention to provide a velocimeter for simultaneously measuring orthogonal velocity components in a fluid flowfield.

Another object of the present invention is to provide a laser velocimeter capable of spatially traversing a fluid flowfield to provide profiles of orthogonal velocity components.

Briefly, in accordance with the present invention, optical means are combined with a laser light source to develop two light beams of different wavelengths. Each light beam is then split into two parallel beams of equal intensity to provide two pairs of beams which are readily identifiable because of their difference in wavelengths. In addition, the beam of one wavelength is split in such a manner that the resulting pair has an orthogonal relationship with respect to the other pair of beams. The four beams are then directed through an optical system which causes them to converge upon a selected test volume within the flowfield. Light scattered at the test volume is then collected, separated according to wavelength and directed onto a pair of photodetector devices which develop electrical signals corresponding to the magnitudes of the respective orthogonal velocity components.

One of the advantages of the present invention is that it permits simultaneous measurement of orthogonal velocity components using maximum available laser radiation.

Another advantage of the present invention is that it permits either spatial scanning of an unsteady flowfield with a minimum mechanical movement, or point-by-point analysis in the case of a steady flow application.

These and other objects and advantages of the present invention will no doubt become apparent to those of ordinary skill in the art after having read the following detailed description of the preferred embodiments which are illustrated in the several figures of the drawing.

IN THE DRAWINGS

FIG. 1 is a block diagram generally illustrating a back scatter velocimeter in accordance with the present invention;

FIG. 2 is a schematic diagram illustrating a presently preferred embodiment of a back scatter, scanning laser velocimeter in accordance with the present invention;

FIG. 3 is an optical diagram used to describe operation of the scanning lens system used in accordance with the present invention;

FIG. 4 is a diagram schematically illustrating a forward scatter, scanning velocimeter in accordance with the present invention;

FIGS. 5 and 6 are partial schematic diagrams illustrating alternative embodiments of a velocimeter in accordance with the present invention.

DESCRIPTION OF THE PREFERRED EMBODIMENTS

A functional block diagram of a velocimeter 10 in accordance with the present invention is shown in FIG. 1 of the drawings to illustrate generally the operative functions of the apparatus. Broadly speaking, the principal function of velocimeter 10 is to provide simultaneous measurement of both vertical and horizontal fluid flow velocity components at selected locations within a given flowfield 11.

Velocimeter 10 includes a dual-wavelength light source 12 capable of generating two readily distinguishable beams of light designated A and B having different wavelengths. Beam A is directed into a vertically oriented beam splitter 13 which splits the beam into two new beams $A_1$ and $A_2$ of equal intensity. Beams $A_1$ and $A_2$ are directed parallel to one another and lie within a common vertical plane. Beam B on the other hand, is passed through a horizontally oriented beam splitter 14 which likewise divides the incident light rays into two beams $B_1$ and $B_2$ of equal intensity. Beams $B_1$ and $B_2$ are also directed parallel to one another but lie within a common horizontal plane which is normal to the previously mentioned vertical plane including beams $A_1$ and $A_2$. The four parallel beams are then passed through a suitable beam combining means 15 which symmetrically orients each beam pair relative to a single optical axis as will be explained in more detailed below.

The combined beams are then passed through openings in an apertured first reflector 16 and an apertured second reflector 17, and thence into an achromatic scanning lens system 18. Lens system 18 is capable of focusing the four beams at a selected common "point" 19, defining finite test volume 20, of the flowfield 11. Selective focusing of lens 18 is accomplished by means of a suitable focus control means 21.

It will be appreciated that at the focus point 19, fluid flowing in the plane of the drawing will have a horizontal velocity component $V_H$ lying in that plane, and a vertical velocity component $V_v$ lying in a plane normal to the plane of the drawing. The incident beams $A_1$ and $A_2$ lie within the vertical plane and the incident beams $B_1$ and $B_2$ lie within the horizontal plane.

At the common intersection 19 of the four beams, an interference fringe pattern is established. The radiation from beams $A_1$ and $A_2$ form an array of bright and dark linear fringes which lie in the horizontal direction. Hence, particles passing through point 19 with a vertical velocity component $V_v$ will scatter light which is shifted from the frequency of light A only by the Doppler frequency. A relationship exists for the intensity of the scattered radiation as a function of the observation direction (e.g., forward scatter or backward scatter). A similar description can be given for the Doppler signals generated at the intersection 19 by means $B_1$ and $B_2$ due to the horizontal velocity component $V_H$, except that in this case the resulting fringe pattern lies in the vertical direction.

In addition to focusing the incident light rays upon the test volume 20, scanning lens 18 also collects back scattered light emanating from the test volume and directs it back onto the reflective surface of reflector 17. For purposes of illustration the back scattered rays of wavelength A are designated $A_{bs}$ and the back scattered rays of wavelength B are designated as $B_{bs}$. Reflector 17, which may for example take the form of a dichroic mirror, is selected to have the characteristic that it reflects light of wavelengths near that of beam A and transmits light of wavelengths near that of beam B. Accordingly, scattered light developed by the incident beams $A_1$ and $A_2$ will be reflected by reflector 17 onto a photodetector 23 while scattered light developed by the incident beams $B_1$ and $B_2$ will be transmitted through reflector 17 to reflector 16 where it is in turn reflected onto a second photodetector 25.

Since the back scattered light $A_{bs}$ contains Doppler information corresponding to the velocity component $V_h$ and the back scattered light $B_{bs}$ contains Doppler information corresponding to the velocity component $V_v$, it will be appreciated that the information contained in the output of photodetector 25 will enable determination of the horizontal velocity component of the fluid flowing at point 19, and information contained in the output of photodetector 23 will enable the vertical velocity component of the flowing fluid to be determined at the same point.

Furthermore, since the velocity component at any point in the flowfield may be detected by changing the focus of lens system 18, a profile of the flowfield may thus be obtained by varying the focal properties of system 18 so that point 19 traverses the flowfield along the desired profile path.

FIG. 2 illustrates the several components of a preferred embodiment of a back scatter velocimeter of the type shown generally in FIG. 1. The dual wavelength light source 12 is comprised of an argon-ion laser 31, a dispersing prism 35 and three directional reflectors 37, 39 and 41. Laser 31 produces a beam 33 of light containing several discrete radiation lines in the visible region. The two strongest lines (wavelengths 488.0 nm and 514.5 nm) are fortunately close in power and may be separated by the simple dispersing prism 35.

Prism 35, which may take the form of a dense flint dispersing prism with an index of 1.72, separates the two beams of interest as illustrated by beams A and B in the drawing. In order to further separate and then align the beams A and B, the directional mirror 37 is positioned to receive the two beams from prism 35, and directional mirror 37 is positioned to receive the two beams from prism 35, and directional mirrors 39 and 41 are positioned to receive the diverging reflected beams A and B respectively, and to re-orient them substantially parallel to each other.

Vertical beam splitter 13 includes a splitter cube 43 positioned to receive the beam A as it is reflected from mirror 39. Cube 43 is oriented in the vertical, tilted manner illustrated with one horizontal edge aligned for interception by the beam A. Cube 43 thus acts to split beam A into the two beams $A_1$ and $A_2$ which are of equal intensity and wavelength are disposed in vertical alignment with each other.

After division, the beams $A_1$ and $A_2$ are passed through a combining means 15 which orients them relative to a second pair of beams $B_1$ and $B_2$ as described below. Beam $A_1$ is first passed through an acousto-optic cell 45 (with water-filled corrector cell which parallelizes the beams $A_1$ and $A_2$) to remove directional ambiguity, and then with beam $A_2$ onto a directional mirror 47 which is positioned to direct the two beams along parallel paths symmetrically disposed about the optical axis OA of lens system 18.

The horizontal beam-splitter 14 includes a splitter cube 49 positioned to receive the beam B reflected from mirror 41. Cube 49 is positioned in the indicated skewed configuration with one vertical edge aligned for interception by beam B. Beam B is thus likewise split into two beams $B_1$ and $B_2$ which are of equal intensity and wavelength but are separated in horizontal, parallel disposition relative to each other.

Beams $B_1$ and $B_2$ are also passed into the combining means 15 wherein beam $B_1$ is, like beam $A_1$, passed through an acousto-optic cell 51 to remove directional ambiguity and render the two beams precisely parallel to one another. Both beams $B_1$ and $B_2$ are then directed onto a mirror 53 which is positioned to reflect the beams along parallel paths disposed horizontally symmetric with the axis OA.

Mirror 53 is positioned between the paths of beams $A_1$ and $A_2$ so as not to interfere with their passage toward lens system 18. Note that as the four beams emerge from combining means 15, they are respectively positioned at 90° intervals about the optical axis OA.

The unidirectional reflector 16 is embodied in the form of a front silvered mirror 55 having four clear apertures therethrough, each of which is aligned with one of the beams $A_1$, $A_2$, $B_1$, $B_2$ such that each beam may pass through the mirror without obstruction. Mirror 55 is positioned with its reflective rear surface oriented at an angle relative to an axis OA for reflecting backscattered light rays onto the detector 25 as will be described below. Although reflector 17 is also embodied as a mirror 57 provided with four apertures aligned with those of mirror 55, it differs from mirror 55 in that in addition, it has the dichroic characteristics of transmitting certain wavelengths of light while reflecting other wavelengths. Mirror 57 is likewise positioned with its reflective surface oriented at an angle relative to axis OA for reflecting certain backscattered rays onto the second detector 23.

The scanning lens system 18 preferably includes a negative achromatic lens 59 positioned to receive the four incident beams $A_1$, $A_2$, $B_1$ and $B_2$, and to disperse the beams at diverging angles toward a positive achromatic lens 61, the center of which is located a distance S (see FIG. 3) from the optical center of lens 59. Lens 61 in turn causes the four beams to converge and intersect at a focus point 19 in the fluid medium 11. Focus point 19 occurs at some distance D remote from the center of lens 61 as determined by the particular interrelation between lens 59 and 61. More specifically, negative lens 59 is movable along the optical axis OA to control the focal distance of the scanning lens combination. Lens 59 and 61 should be achromatic so that the two sets of crossing beams $A_1$, $A_2$ and $B_1$, $B_2$ focus at the same point for all focus variations.

Light scattered in the "backward" direction at the point 19, as indicated by the dashed lines $A_{bs}$, is collected by lens system 18 and directed back onto the reflective surface of dichroic mirror 57. Since dichroic mirror 57 has the characteristic of reflecting light of wavelength A and transmitting light of wavelength B, the backscattered rays $A_{bs}$ will be reflected into detector 23 while the backscattered rays $B_{bs}$ will be transmitted to mirror 55 for reflection into detector 25.

In simplified form, detector 23 may include a converging lens 63, a reflecting mirror 65 and a photomultiplying device 67. Lens 63 collects light ($A_{bs}$) reflected from mirror 57 and focuses it via reflector 65 onto the light sensitive face of photomultiplier 67 which in turn develops an electrical signal responsive thereto for output on line 68.

Detector 25 includes a converging lens 69, a reflecting mirror 71 and a photomultiplying device 73. Lens 69 collects light ($B_{bs}$) reflected from mirror 55 and focuses it via reflector 71 onto the light sensitive face of photomultipler 73 which in turn develops an electrical signal responsive thereto on line 74. Since the modulated intensities of the respective quantities of backscattered light $A_{bs}$ and $B_{bs}$ are proportional to the respective vertical and horizontal velocity components of the fluid stream, the signals developed on lines 68 and 74 likewise contain such information.

To develop a velocity profile across the flow-field of stream 11, focus position control 21 may be used to change the position of negative lens 59 thereby varying the distance S and in turn varying the focus distance D. Thus, an entire cross-section of the stream may be scanned by simply controlling the position of lens 59. In addition to being achromatic, both lens 59 and 61 are of a low f number with the minimum distance D being determined by the diameter of positive lens 61 and the maximum distance D being determined by the distance beyond which the received scattered radiation is too small to be accurately detected. The spatial scanning operation of lens 59 and 61 is, as mentioned previously, illustrated in FIG. 3 of the drawing and the sensitivity of control of the scanning system may be represented mathematically as $$dD/dS = -[f_p/s + f_n - f_p]^2$$
$$= -[D/f_p - 1]^2$$

where
$f_p$ is the focal length of positive lens 61 and
$f_n$ is the focal length of negative lens 59.

Assuming a nominal range D of 7 feet, for a f/1 system (with $f_p$ = 8 inches) the sensitivity $dD/dS = -90$ so that at this distance a change of S of 0.1 inch results in a movement of the test volume of 9 inches. Hence, if the negative lens is moved at a rate of $\Delta s/\Delta t = -0.5$ inch/sec., the beam intersection is traversing the flow field at approximately 4 feet/sec. This allows for rapid interrogation of unsteady flows where the area of interest is on the order of several feet wide and the flow does not vary appreciably over a time of about 1 second. Frequency tracking systems are easily capable of processing the signal at these rates.

FIG. 4 illustrates an alternative embodiment of a velocimeter 100 in accordance with the present invention which differs from the previously described embodiment in that it is adapted to operate in the forward scatter mode. Those components of velocimeter 100 which correspond to like elements of FIGS. 1 and 2 are designated by like reference numerals. The principal difference between this embodiment and the backscatter embodiment is that the reflectors 16 and 17 are removed from between the combining means 15 and the lens system 18, and separate light collecting and detecting systems are disposed in a position to collect and detect forward scattered light. The light $A_{fs}$ and $B_{fs}$ scattered in the forward direction from focus point 101 is collected by a lens system 102, which may be quite similar to the scanning lens system, and is directed onto detectors 23' and 25' which are similar to their like numbered compliments in FIGS. 1 and 2.

Whereas detector 23' may be placed along the optical axis of lens system 102 for receiving scattered light $B_{fs}$ which is transmitted through a light separating means 106, the detector 25' is positioned off the primary axis and along a secondary axis of means 106. In addition, since a change of focus of scanning lens system 18 changes the position of the illuminated test volume, the focus of collecting system 102 must also be varied. In order to make the scanning lens and collecting lens system "track," a differential focus control means may be provided to simultaneously drive the two systems in a complimentary fashion. The control may of course be electrical or mechanical in nature.

Obviously, more scattered light can be collected from a particular point if a forward scattered collection system is focused on the desired point. Some provision must then be made for changing the point of focus of the collector system to follow the motion of the scanning lens system. One method of doing this is shown in FIG. 5 wherein light from the intersection region of the scanning beams is collected by a positive lens 110 and rendered parallel by a negative lens 112. A small part of the resulting more or less parallel beams of light 113 is diverted by a beam-splitter 114 through a lens 115 another splitter 116, and onto two focus detectors 117 and 118.

Each of the focus detectors has a small circular aperture provided in front of it. One aperture is separated from the proceeding lens by a little less than the focal length of the lens, the other aperture is separated from the lens by slightly more than the focal length. The two detectors are then balanced to yeild equal signals when parallel light reaches the preceding lens. This is the same as saying that the negative lens, whose potential focusing motion is indicated by the double-headed arrow 119 is in the correct position for the collection optics to be focused on the intersection of the scanning laser beams.

When the transmitting optics is scanned, the intersection of the beams will move to a position a different distance from the collector optics 110. The light thus passing through the negative lens will then no longer be quite parallel in reaching the focus detector lens and accordingly, the relative amount of light reaching the two focus detectors 117 and 118 will change permitting the development of a servo-signal which can be used to drive a control means 21' for controlling the position of the negative lens 112 to maintain proper focus.

Alternatively, the collecting system for the forward scatter mode can be stationary rather than scanning if it is of a type which collects a quasi-parallel beam and is not sharply focused to a single point. In such an embodiment as shown in part in FIG. 6, light is collected from a cylindrical volume co-axial with the laser-scanner optics by means of a conveying lens 120 and a collimating lens 122 separated by a defining aperture 124. As the focal point at which the four laser beams meet scans back and forth along the axis OA, it always remains within the cylindrical volume viewed by the collection and detection system. This scheme will allow some light outside the focus point to reach the detectors but in a well designed system the resulting error will be nominal. Alignment and other practical problems set limits on how small the diameter of the collection volume can be made.

Although a limited number of alterations and modifications are disclosed herein by way of example, it is to be understood that the appended claims are intended to cover all such alterations and modifications as fall within the true spirit and scope of the invention.

What is claimed is:

1. Doppler velocimeter apparatus for simultaneously measuring fluid velocity components at points within a fluid stream, comprising:

a light source for developing one light beam having a first wavelength and another light beam having a second wavelength;

light splitting means for dividing said one light beam into first and second parallel light beams respectively disposed on each side of an optical axis, and for dividing said other light beam into parallel third and fourth light beams respectively disposed on opposite sides of said axis, said first and second light beams lying in a first plane including said axis, and said third and fourth light beams lying in a second plane including said axis;

light focusing means disposed along said axis and operative to focus said first, second, third and fourth light beams at a common point within the fluid stream, the light of said beams being scattered by the stream at said common point;

collecting means for collecting the light scattered at said common point;

first light detecting means responsive to light directed thereupon and operative to develop first electrical signals commensurate therewith;

second light detecting means responsive to light directed thereupon and operative to develop second electrical signals commensurate therewith; and light separating means for separating the collected scattered light of said first wavelength from the collected scattered light of said second wavelength, and for directing the first mentioned separated light onto said first light detecting means and for directing the second mentioned separated light onto said second light detecting means, whereby said first electrical signals are representative of a first fluid velocity component and said second electrical signals are representative of a second fluid velocity component.

2. Doppler velocimeter apparatus as recited in claim 1 wherein said light source includes, a laser device for developing a beam of coherent radiation having several discrete radiation lines, and light dispersing means for separating said beam of coherent radiation into said one beam and said other beam.

3. Doppler velocimeter apparatus as recited in claim 1 wherein said light focusing means and said light collecting means are embodied in a single optical system for collecting back-scattered light, and wherein said light separating means includes a first reflector having dichroic characteristics and a second reflector, both of which are positioned along said optical axis between said light splitting means and said light focusing means, said first reflector being operative to reflect scattered light of said first wavelength onto said first detecting means and to transmit light of said second wavelength onto said second reflector, said second reflector being operative to reflect light of said second wavelength onto said second detecting means.

4. Doppler velocimeter apparatus as recited in claim 1 wherein said light focusing means comprises a lens combination including a negative achromatic lens and a positive achromatic lens, at least one of said lens being movable along said optical axis relative to the other lens to permit variation of the spatial position of said common point.

5. Doppler velocimeter apparatus as recited in claim 1 wherein said light focusing means is positioned on one side of said fluid stream and wherein said light collecting means is positioned on the opposite side of said stream to collect forward scattered light.

6. Doppler velocimeter apparatus as recited in claim 5 wherein said light focusing means and said light collecting means each include means for permitting their respective focal points to be varied, and said velocimeter apparatus further includes control means for synchronously varying the focal points of said light focusing means and said light collecting means so that the two focal points are at all times coincident.

7. Doppler velocimeter apparatus as recited in claim 5 wherein said light collecting means includes means for sensing the position of said common point and for automatically focusing said light collecting means thereupon.

8. Doppler velocimeter apparatus as recited in claim 1 wherein said light splitting means includes, a first splitter block positioned to receive said one light beam and to split it into said first light beam and said second light beam whereby said first and second light beams lie in a vertical plane, and a second splitter block for receiving said other light beam and dividing it into said third and fourth light beams whereby said third and fourth light beams lie within a horizontal plane.

9. Doppler velocimeter apparatus as recited in claim 8 wherein said light splitting means further includes a light combining means for combining the vertically related first and second light beams and the horizontally related third and fourth light beams in a manner whereby all are directed in parallel to each other and respectively disposed in orthogonal positions about said optical axis.

10. Doppler velocimeter apparatus as recited in claim 9 wherein said light focusing means and said light collecting means are embodied in a single optical system for collecting back-scattered light, and wherein said light separating means includes a first reflector having dichroic characteristics and a second reflector, both of which are positioned along said optical axis between said light splitting means and said light focusing means, said first reflector being operative to reflect scattered light of said first wavelength onto said first detecting means and to transmit light of said second wavelength onto said second reflector, said second reflector being operative to reflect light of said second wavelength onto said second detecting means.

* * * * *